July 28, 1925.
J. MACIEJCZYK ET AL
AUTOMOBILE BUMPER
Filed Oct. 1, 1924
1,547,511
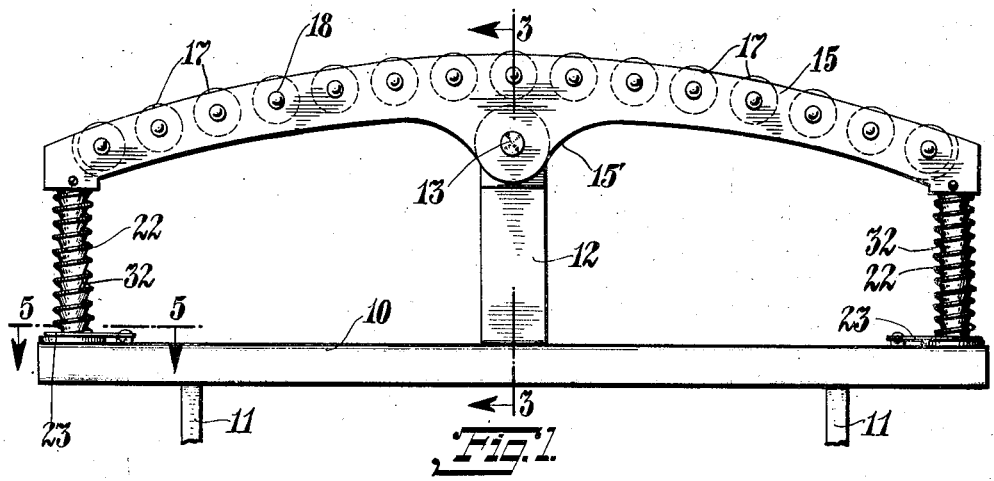
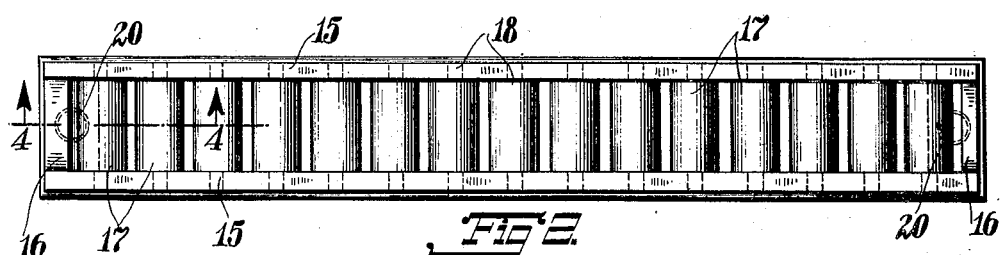
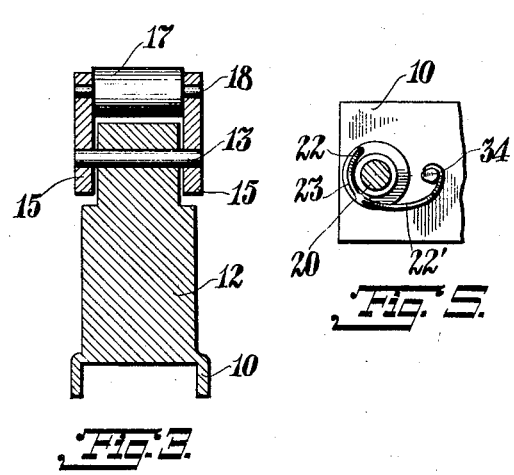
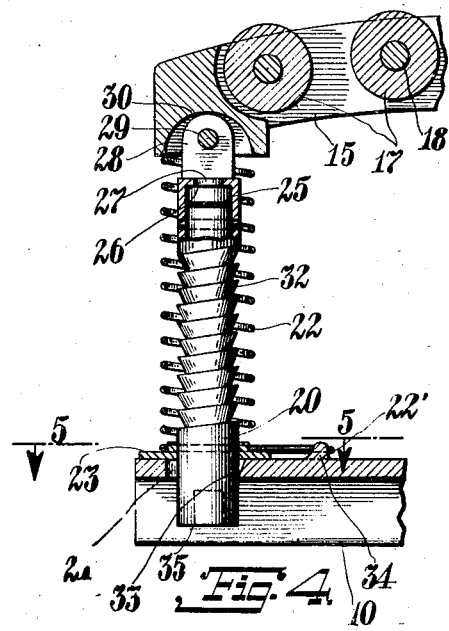
INVENTORS
Jan Jarosz
Joseph Maciejczyk
BY
ATTORNEY Patented July 28, 1925.

1,547,511

UNITED STATES PATENT OFFICE.

JOSEPH MACIEJCZYK AND JAN JAROSZ, OF LOWELL, MASSACHUSETTS.

AUTOMOBILE BUMPER.

Application filed October 1, 1924. Serial No. 740,908.

*To all whom it may concern:*

Be it known that we, JOSEPH MACIEJCZYK and JAN JAROSZ, both citizens of Poland, residing at Lowell, in the county of Middlesex and State of Massachusetts, have invented certain new and useful Improvements in Automobile Bumpers, of which the following is a specification.

This invention relates to automobile bumpers or fenders, the invention having for an object to provide a novel form of automobile bumper which will act to deflect the object struck to one side, and which is also provided with means whereby recoil of the bumper is prevented in order to protect the car against damage by the impact with the deflected object.

For further comprehension of the invention, and of the objects and advantages thereof, reference will be had to the following description and accompanying drawing, and to the appended claims in which the various novel features of the invention are more particularly set forth.

Fig. 1 of the drawing is a plan view of our improved bumper.

Fig. 2 is a front view thereof.

Fig. 3 is a detail transverse sectional view taken on the line 3—3 of Fig. 1.

Fig. 4 is a fragmentary central horizontal sectional view taken on the line 4—4 of Fig. 2, certain parts being shown in elevation.

Fig. 5 is a detail sectional view taken on the line 5—5 of Fig. 4.

Referring now to the drawing, our improved bumper comprises a frame-bar 10 that is adapted to be mounted in front of the automobile in position extending transversely thereof, this bar having attached thereto ordinary arms 11 that extend rearwardly to be secured in the usual manner to the main side frame members of the automobile. This bar 10 supports the movable fender or bumper element. To this end a block 12 is fixed to the front face of the bar, midway between the ends thereof, and has pivotally connected thereto as at 13 the movable fender element. This movable fender element comprises a pair of vertically spaced flat bars 15 that are rigidly connected at their ends by the vertical members 16. These bars are curved from end to end as shown in Fig. 1 of the drawing and may be widened at their central portions as at 15' to form ears whereby they are engaged with the block 12. Located between these bars, on vertical axes, are rollers 17 which are arranged in slightly spaced relation along the front of the movable fender element, being provided with trunnions such as 18 that engage in suitable apertures in the said bars 15.

A yielding abutment is formed at each end for the movable fender element. These abutments each consist of a rod 20 that is attached at one end to the movable fender element and projects at its opposite end through an elongated aperture 21 in the bar 10, this rod being surrounded by a coiled compression spring 22, the spring bearing at one end against the end of the movable fender element and at its opposite end against a washer 23 interposed therebetween and the bar 10. The rod 20 is preferably connected to the movable fender element in a manner to permit both of swinging movement of the rod around its point of connection with the said movable fender element and of rotary movement of the rod. To this end the front end of the rod has fixed thereto a collar 25 that has an inturned flange 26 on its forward end engaging in a groove 27 in the head 28 that is pivoted as at 29 in a recess 30 in the part 16, a swivel connection being thus effected between the rod 20 and the head 28. The intermediate portion of the rod is formed with a helical groove 32 of substantially ratchet toothed formation. The rear end of this groove is normally spaced forwardly from the bar 10, but upon excessive rearward swinging movement of one end of the movable fender element this groove will be moved backward to register with a tooth 33 formed on the wall of the slotted aperture 21 in the bar 10. To press the rod 25 yieldingly against the tooth 33, and thereby ensure of engagement of the latter in the groove 32 when the rod moves rearwardly, the end turn of the spring 22 may be coiled as at 22' around a lug 34 projected from the face of the bar 10. The rod 20 is formed in its rear end with a squared socket 35 to receive a suitable turning tool.

As will be apparent, if a heavy blow is given the movable fender element, compressing either of the springs 22 to a high degree, the said fender element will be prevented from recoiling. To restore the fender element to normal position a tool is inserted in the socket 35 and the rod turned until the tooth 33 rides out of the groove 32, the expansive force of the spring 22 being then reduced sufficiently to obviate danger of damage to parts when the rod is freed.

Having thus described our invention, what we claim as new and desire to protect by Letters Patent of the United States is as follows:—

1. A bumper for automobiles comprising a bar arranged for rigid mounting at the front of an automobile, a movable fender bar pivotally connected midway between its ends to the first named bar, and yielding abutment elements inserted between the ends of the said bars.

2. A bumper for automobiles comprising a bar aranged for rigid mounting at the front of an automobile, a movable fender bar pivotally connected midway between its ends to the first named bar, and yielding abutment elements inserted between the ends of the said bars, said abutment elements comprising rods attached at one end to the said movable fender bar and projecting at opposite ends through apertures in the first named bar, and compression springs surrounding said rods.

3. A bumper for automobiles comprising a bar arranged for rigid mounting at the front of an automobile, a movable fender bar pivotally connected midway between its ends to the first named bar, and yielding abutment elements inserted between the ends of the said bars, and a series of rollers mounted on said movable fender bar and spaced therealong.

4. A bumper for automobiles comprising a bar arranged for rigid mounting at the front of an automobile, a movable fender bar pivotally connected midway between its ends to the first named bar, and yielding abutment elements inserted between the ends of the said bars, said abutment elements comprising rods attached at one end to the said movable fender bar and projecting at opposite ends through apertures in the first named bar, and compression springs surrounding said rods, and detent elements on said first named bar arranged to engage either of said rods to prevent recoil of the movable fender bar upon excessive rearward movement of the latter.

5. In a bumper for automobiles, a frame bar, a movable fender bar located in front of said frame bar, a head pivotally attached to the said movable fender bar, a rod having a swivel connection with said head, said rod having a ratchet toothed helical groove formed therein, a tooth on said frame bar adapted to engage in said groove upon excessive rearward movement of the rod, and a compression spring surrounding the rod and bearing between the movable fender element and frame bar.

6. In a bumper for automobiles, a frame bar, a movable fender bar located in front of said frame bar, a head pivotally attached to the said movable fender bar, a rod having a swivel connection with said head, said rod having a ratchet toothed helical groove formed therein, a tooth on said frame bar adapted to engage in said groove upon excessive rearward movement of the rod, and a compression spring surrounding the rod and bearing between the movable fender element and frame bar, said frame bar being formed with a projecting lug, and said compression spring having its end turn engaged with said lug to retain the said rod pressed against the said tooth.

In testimony whereof we affixed our signatures.

JOSEPH MACIEJCZYK.
JAN JAROSZ.